United States Patent
Bresniker

(10) Patent No.: US 8,230,145 B2
(45) Date of Patent: Jul. 24, 2012

(54) MEMORY EXPANSION BLADE FOR MULTIPLE ARCHITECTURES

(75) Inventor: Kirk M. Bresniker, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 434 days.

(21) Appl. No.: 11/882,265

(22) Filed: Jul. 31, 2007

(65) Prior Publication Data

US 2009/0037657 A1    Feb. 5, 2009

(51) Int. Cl.
- G06F 3/00 (2006.01)
- G06F 13/12 (2006.01)
- G06F 13/38 (2006.01)
- G06F 13/42 (2006.01)
- G06F 13/20 (2006.01)
- G06F 13/36 (2006.01)
- G06F 12/00 (2006.01)
- G06F 13/00 (2006.01)
- G06F 1/00 (2006.01)
- H04L 12/28 (2006.01)

(52) U.S. Cl. ......... 710/74; 710/2; 710/62; 710/64; 710/105; 710/313; 710/315; 711/2; 711/104; 711/105; 711/154; 711/168; 711/170; 370/395.5; 713/300

(58) Field of Classification Search ............ None
See application file for complete search history.

(56) References Cited

U.S. PATENT DOCUMENTS

| | | | | |
|---|---|---|---|---|
| 5,471,603 A * | 11/1995 | Yokote et al. | ...... | 711/2 |
| 5,651,129 A * | 7/1997 | Yokote et al. | ...... | 711/104 |
| 6,681,301 B1 * | 1/2004 | Mehta et al. | ...... | 711/154 |
| 6,768,640 B2 * | 7/2004 | Doblar et al. | ...... | 361/695 |
| 7,096,306 B2 * | 8/2006 | Riley | ...... | 710/313 |
| 7,379,316 B2 * | 5/2008 | Rajan | ...... | 365/63 |
| 7,480,303 B1 * | 1/2009 | Ngai | ...... | 370/395.5 |
| 7,516,293 B2 * | 4/2009 | Baska et al. | ...... | 711/170 |
| 7,761,623 B2 * | 7/2010 | Karamcheti et al. | ...... | 710/62 |
| 7,925,854 B2 * | 4/2011 | Oh et al. | ...... | 711/167 |
| 8,051,253 B2 * | 11/2011 | Okin et al. | ...... | 711/154 |
| 2002/0010835 A1 * | 1/2002 | Post et al. | ...... | 711/115 |
| 2003/0084233 A1 * | 5/2003 | Williams | ...... | 711/105 |
| 2003/0217244 A1 * | 11/2003 | Kelly | ...... | 711/168 |
| 2006/0212644 A1 * | 9/2006 | Acton et al. | ...... | 711/103 |
| 2006/0236134 A1 * | 10/2006 | Kamepalli et al. | ...... | 713/300 |
| 2006/0256603 A1 * | 11/2006 | Foster, Sr. | ...... | 365/63 |
| 2008/0082766 A1 * | 4/2008 | Okin et al. | ...... | 711/154 |
| 2008/0126690 A1 * | 5/2008 | Rajan et al. | ...... | 711/105 |
| 2008/0186667 A1 * | 8/2008 | Verdiell et al. | ...... | 361/686 |
| 2008/0229049 A1 * | 9/2008 | Nanda et al. | ...... | 711/173 |
| 2008/0313319 A1 * | 12/2008 | Geffin | ...... | 709/223 |

* cited by examiner

Primary Examiner — Chun-Kuan Lee
Assistant Examiner — Henry Yu

(57) ABSTRACT

A memory expansion blade for a multi-protocol architecture, includes dual inline memory modules (DIMMs) and a multi-protocol memory controller coupled to the DIMMs and operable to control operations of the DIMMs. The multi-protocol memory controller includes one or more memory channel controllers, with each of the memory channel controllers coupled to a single channel of DIMM, and where the DIMM in each single channel operate according to a specific protocol. The controller further includes a protocol engine coupled to the memory channel controllers, where the protocol engine is configurable to accommodate one or more of the specific protocols, and a system interface coupled to the protocol engine and configurable to provide electrical power and signaling appropriate for the specific protocols.

15 Claims, 4 Drawing Sheets

MEMORY EXPANSION BLADE FOR MULTIPLE ARCHITECTURES

BACKGROUND

Computers, such as personal computers, are often connected to data networks, such as the Internet, to enable data transfer from one computer to another computer. When multiple computers share large amounts of data, a server is often connected to the data network to provide data to the computers. Servers allow many computers to access information that is stored within the network.

Bladed servers are one type of server. Bladed servers are comprehensive computing systems that typically include a processor, memory, network connections, and associated electronics all on a single or multiple circuit cards called a server blade, for example. Typically, one or more server blades are contained in a chassis, along with server appliance blades, network-switch blades, storage blades, management blades, local area network (LAN) blades, and other blades. These various blades may be mounted in a cabinet or other enclosure.

Other solutions to obtaining the desired density of memory to processor cores employ rack systems to house the required hardware components. In a typical application, several chassis are stacked vertically in vertical rack cabinets or are placed side by side in horizontal rack cabinets. However, rack systems often are more costly to implement than blade systems, and do not have the modularity that makes blade systems attractive.

DESCRIPTION OF THE DRAWINGS

The detailed description will refer to the following drawings in which like numerals refer to like items, and in which.

DETAILED DESCRIPTION

Figure 1:
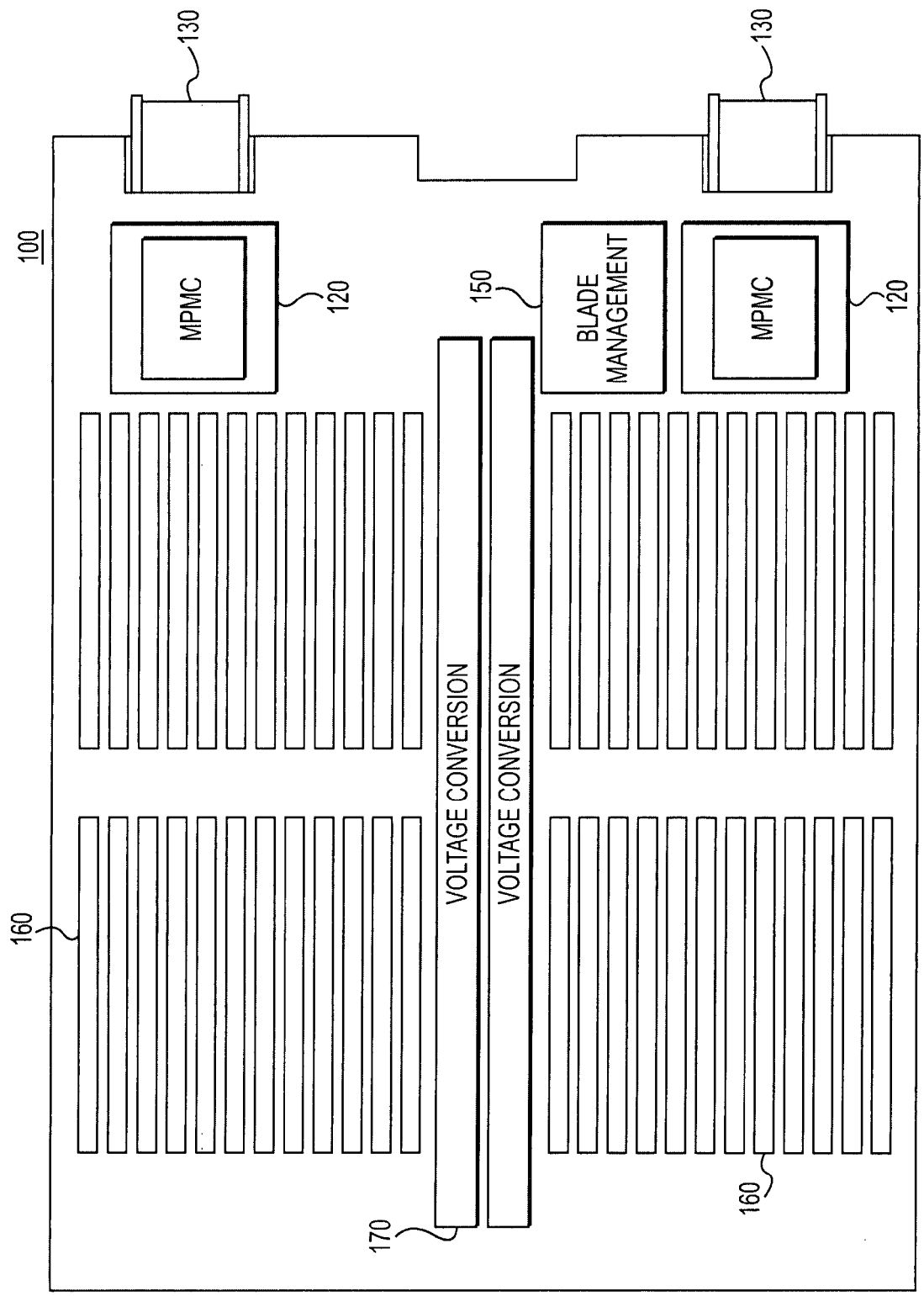
FIG. 1 is a block diagram of an embodiment of a memory expansion blade system.

Advances in centralized data processing centers have resulted in smaller form factors for server devices and an increase in the density of processing units, thereby reducing space requirements for computing infrastructure. One common form factor has been termed in the art a blade server. Bladed servers, or bladed computer systems, are computing systems that provision servers or other computer resources on individual cards, or blades. There are many types of blades—processor blades, server blades, storage blades, network blades, etc.—and one or more of each type of blade is typically housed together in a single structure, thus creating high-density computing systems with modular architectures, ensuring flexibility and scalability of the systems, and reducing space requirements. Server blades, along with storage, networking, and other blades, are typically installed in a rack-mountable enclosure, or chassis, which hosts multiple blades. The multiple blades share common resources, such as cabling, power supplies, and cooling fans.

The use of servers as devices within communications networks is well known in the art. A server is equipment that makes available file, database, printing, facsimile, communications or other services to client terminals/stations with access to the network the server serves. When the server permits client/terminal station access to external communications network it is sometimes known as a gateway. Servers are available in different sizes, shapes and varieties. Servers may be distributed throughout a network or they may be concentrated in centralized data centers.

An exemplary blade server application comprises a device built for vertically inserting into a chassis that can house multiple devices that share power and other connections over a common backplane, i.e., a blade center. Slim, hot swappable blade servers fit in a single chassis like books in a bookshelf—and each is an independent server, with its own processors, memory, storage, network controllers, operating system and applications. The blade server, also referred to simply as a blade, slides into a bay in the chassis and plugs into a mid- or backplane, sharing power, fans, floppy drives, switches, and ports with other blade servers. The benefits of the blade server approach will be readily apparent to anyone tasked with running down hundreds of cables strung through racks just to add and remove servers. With switches and power units shared, precious space is freed up—and blade servers enable higher density with far greater ease. With a large number of high-performance blade servers in a single chassis, blade technology achieves high levels of density.

Thus, blade servers are very dense, easily serviceable, low cost-of-ownership modular hardware platforms. Blade servers integrate microprocessors, memory, storage, and input/output (I/O) functions onto a single, hot pluggable module design against a common physical and electrical interface regardless of the microprocessor or operating system used.

Figure 3:
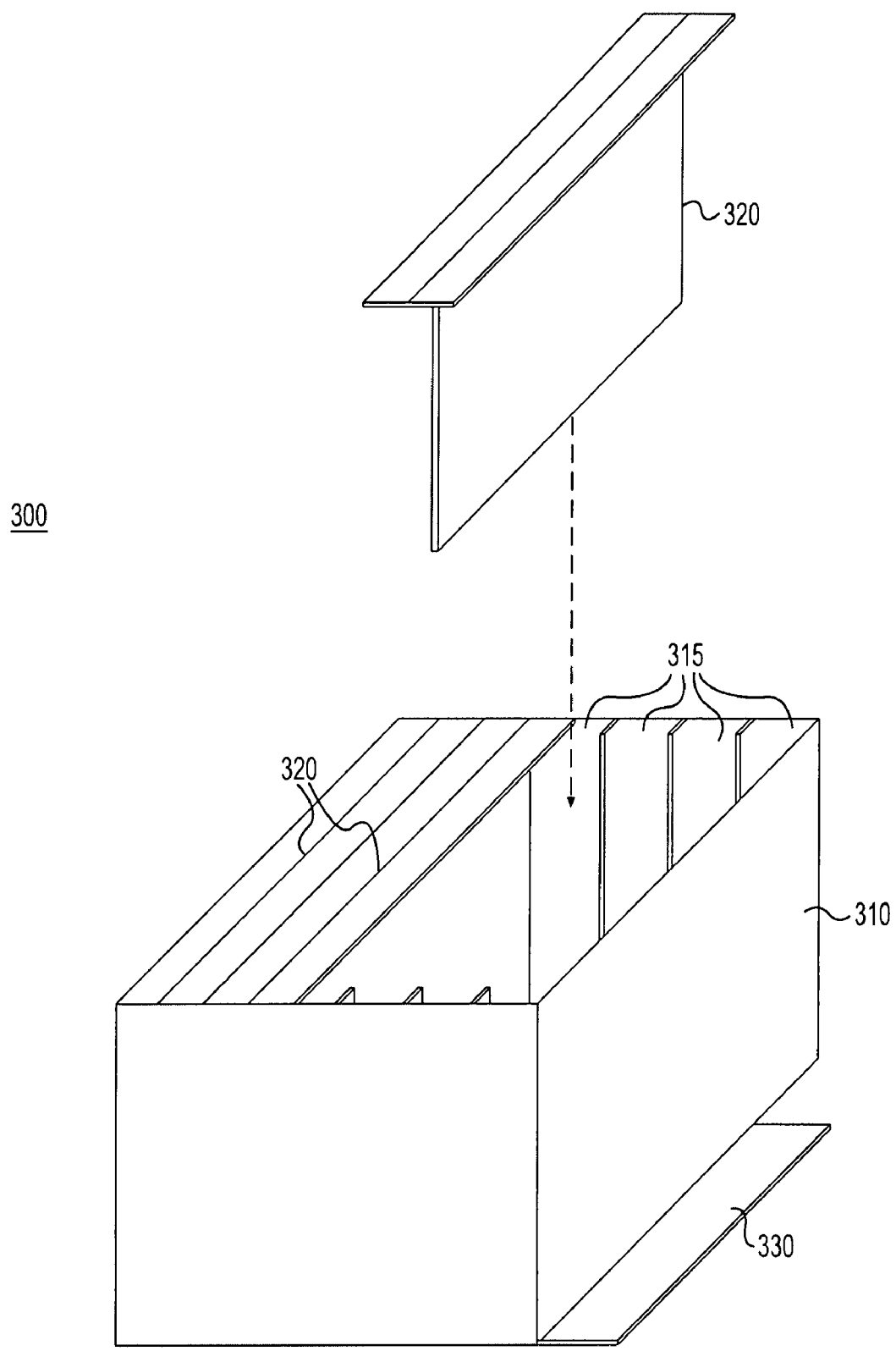
FIG. 3 is a perspective view of an exemplary blade server application.

FIG. 3 illustrates an exploded perspective view of an exemplary blade server application 300. In FIG. 3, main chassis 310 houses all the components of the blade server application. The main chassis 310 provides all the power, cooling, and I/O infrastructure needed to support modular server, interconnect, and storage components. Power is delivered through a pooled-power backplane 330 that ensures the full capacity of the power supplies is available to all server blades for maximum flexibility and redundancy. In the illustrated application 300, processor blades 320 (or other blades, such as storage blades) are hot pluggable into corresponding slots 315 in the main chassis 310. The term "server blade," "blade server," "processor blade," or simply "blade" should be understood to mean not only blades that perform "processor" or "server" functions, but also blades that perform other functions, such as storage blades, which typically include hard disk drives and whose primary function is data storage.

Processor blades provide the processor, memory, hard disk storage and firmware of an industry standard server. In addition, they may include keyboard, video and mouse (KVM) selection via a control panel, an onboard service processor, and access to removable media drives. A daughter card (not shown) may be connected via an onboard PCI-E or PCI-X interface and is used to provide additional high-speed links to various modules.

Blades 320 may be "hot swapped," meaning removed or installed in the power on state, without affecting the operation of other blades in the system. A blade server is typically implemented as a single slot card; however, in some cases a single processor blade may require two or more slots. A processor blade 320 can use any microprocessor technology as long as it is compliant with the mechanical and electrical interfaces, and the power and cooling requirements of the blade server system.

To increase memory of the application 300, herein described memory expansion blades may be used with the application 300 to allow for a single, common design blade to connect, by way of the blade fabric, to server blades containing one or more microprocessor architectures. The memory expansion blades accomplish this objective by using a memory controller with a multi-protocol interface in an integrated device that allows connection of industry standard DIMMs to both coherent memory interfaces and non-coherent I/O interfaces.

Modern computer memories use double data rate (DDR) dynamic RAM (DRAM) technology, with the latest version being DDR3 (for DDR three synchronous). DDR technology means that the data transfer rate is twice the clock rate. DDR3 technology memory can run its bus at four times the speed of the memory cells it contains, albeit at a cost of higher latency. More specifically, the frequencies of DDR3 memory are raised beyond those of DDR2 due to doubling of the data prefetch that was moved from the information storage device to an input/output buffer. While DDR2 DRAM uses 4-bit samples, DDR3 DRAM uses 8-bit prefetch also known as 8n-prefetch. In other words, DDR3 DRAM technology implies doubling of the internal bus width between the actual DRAM core and the input/output buffer. As a result, the increase in the efficient data transfer rate provided by DDR3 DRAM does not require faster operation of the memory core. Only the external buffers start working faster. As for the core frequency of the memory chips, it appears 8 times lower than that of the external memory bus and DDR3 buffers (this frequency was 4 times lower than that of the external bus by DDR2).

These DDR DRAM modules are installed in a dual inline memory module (DIMM). A modern DIMM module may have a memory capacity of 2 GB or more.

A typical DIMM will have eight DRAM modules installed in a single rank. A rank represents all the DRAM modules selected when a memory controller executes a memory transaction. A rank can extend across 1, 2, or 4 DIMMs, depending on the memory sub-system architecture. A single rank DIMM provides eight bytes (64 bits) of data outputs. Current DIMMs can have 1, 2, or 4 ranks. Theoretically, the number of ranks on a DIMM could be eight or more. A DIMM with two ranks may have eight DRAM modules installed on one side of a planar, and another eight DRAM modules installed on the opposite side of the planar. The DIMM is then installed into clips on a computer system motherboard. The motherboard can be configured to hold any number of DIMMs, subject to the usual constraints of motherboard size, heat loading, and other factors. With the latest generation (DDR3) technology, operating voltages have dropped from 2.5 volts (for DDR) to 1.5 volts, thereby reducing the heat loading factor and allowing greater memory density on the motherboard.

A DIMM channel represents all the DIMMS connected to the same data bits. A memory controller can control 1, 2, or 4 DIMM channels operating in lockstep. The number of DIMMs on a DIMM channel depends on the memory technology (DDR1, DDR2, DDR3, etc.) and memory sub-system operating frequency. For example, DDR1 technology allows up to four 2-rank DIMMs operating at 200 MT/s on a channel while DDR3 technology allows up to two 4-rank DIMMs per channel operating at 1067 MT/s.

To allow further memory expansion in a host processor system such as that described above, regardless of the protocols employed by the processor blades, and regardless of the operating characteristics of the host system, a memory controller comprises one or more memory channel controllers, with each of the memory channel controllers coupled to a separate memory channel for DIMM attachment. The one or more memory channels are coupled to a protocol engine that is configurable to run one of several protocols, depending on the specific memory device used with the DIMMs. The protocol engine connects to a system interface. The system interface is a hardware layer between the protocol engine and the host processor system. The system interface is a generic, high-speed, low voltage differential signaling device that is configured to match the electrical and functional requirements of the equivalent protocol currently being hosted in the protocol engine.

Figure 4:
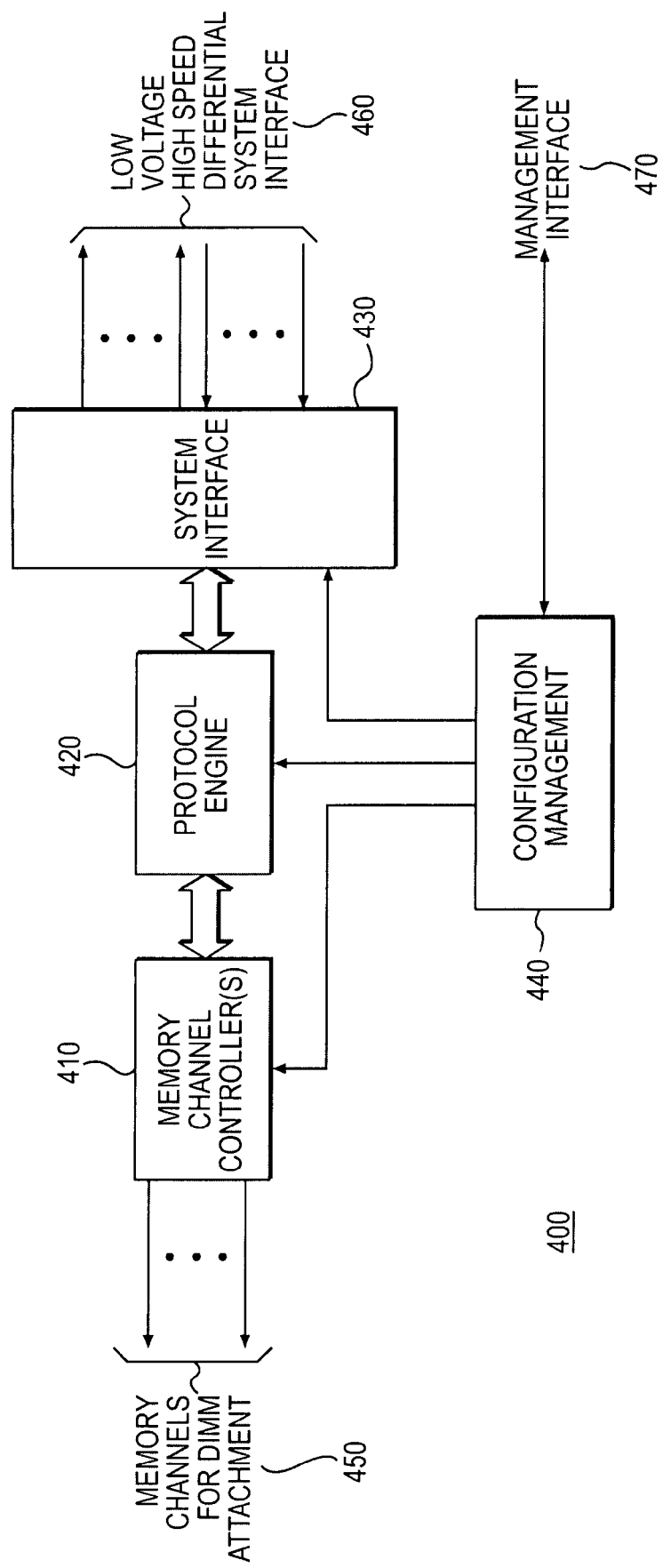
FIG. 4 is a block diagram of an exemplary memory controller used to control memory devices of the memory expansion blade.

FIG. 4 is an overall block diagram of the hardware components of an exemplary memory controller 400. The memory controller 400 allows expansion memory capacity to be added to processor blades from several different vendors, at multiple locations, and both inside and outside the coherency domain. In one embodiment, the memory expansion is achieved by connecting the memory controller 400 to a multi-system interconnect such as an IB or Ethernet connection.

The memory controller 400 couples a plurality of memory channels 450 for DIMM attachment to a host processor system 460. Each of the plurality of DIMM memory channels connects to a memory channel controller 410, such that there is one memory channel controller 410 for each DIMM channel 450. The multiple memory channel controllers are coupled to a single protocol engine 420, which in turn connects to system interface 430. Finally, configuration management module 440 connects to the memory controllers 410, protocol engine 420, and system interface 430, as well as to a management interface layer 470.

The DIMM memory channels 450 contain any number of DIMMs. The DIMMs may be of any technology, such as fully buffered DIMMs (FB-DIMMs), for example. Furthermore, each channel may employ different types of DIMM, and/or DIMMs from different manufacturers.

The memory channel controllers 410 are hardware devices that perform the functions of memory address decoding, read/write operations, and memory refreshing. The memory channel controllers 410 include advanced error correction such as double chip spare, enabling a reliable memory sub-system. The memory channel controllers 110 also include a very low power hibernation mode that allows the DIMMs to remain refreshed and active at very low power.

Coupled to the memory channel controllers 410 is the protocol engine 420, which is a lightweight hardware layer between the memory channel controllers 410 and the system interface 140. The protocol engine 420 is configurable to run one of several memory protocols, including cHT or CSI cache coherency protocols, fully buffered DIMM protocol, PCI-E protocol, and IB or Ethernet with iWARP/RDMA protocol. In an embodiment, the protocol engine 420 is pre-programmed with a plurality of protocols, such as those stated above. In an alternate embodiment, the appropriate protocol is loaded into the protocol engine 420 from the configuration management module 440. When the host system is fully configured, or at some later time, is reconfigured, a host system user can select the protocol that is appropriate for the installed, or reconfigured, memory devices.

The system interface 430 is a hardware layer that connects the protocol engine 420 to the host system. The system interface 430 can be configured to match the electrical and functional requirements of the equivalent protocol currently being hosted in the protocol engine 420.

Finally, a configuration management module 440 is coupled to the memory channel controllers 410, the protocol engine 420, and the system interface 430. The configuration management module is a hardware layer that allows the host system user, or other person, to interface with the components of the memory controller 410 to configure such components according to the memory devices attached to the memory controller 410. The configuration management module 440 provides a signal path to management interface 470 so that the system user can view possible protocol and system selection options, and make an appropriate selection from among the options.

Because it is configurable according to a device's protocol and electrical requirements, the memory controller 400 can serve as the host system's primary coherent memory controller, a secondary expansion memory controller, and a secondary non-coherent I/O based intra-system or intra-partition memory controller.

As noted above, to increase the memory capacity of a blade server application, such as the application 300 shown in FIG. 3, memory expansion blades are used. FIG. 1 is a diagram of an exemplary memory expansion blade 100 that supports multiple architectures. The blade 100 comprises three parts: the base blade, the memory controllers 120, and the DIMMs 160. The base blade contains the standardized management and power interfaces 130 that mate the blade 100 to the blade enclosure, voltage conversion modules 170, and blade management module 150, all mounted on a blade planar. In an embodiment, the blade enclosure, or chassis, uses a concept of a generic fabric, which allows multiple electrical and functional protocols to run over a common connection system (e.g., interfaces 130). The base blade management module 150 interacts with the blade enclosure to determine the best protocol match given either a user selection or an automatic selection based on other blades installed in the enclosure. This generic fabric connection allows the blade 100 to attach directly to coherent fabrics inside a system or partition, if available, or allows the blade 100 to attach to multiple blades by way of a non-coherent fabric.

The memory controllers 120, described above, interface through the base blade to the blade enclosure. The memory controllers 120 are configured by the base blade 100 to run the appropriate electrical and functional protocols to effectively communicate, either coherently on non-coherently, with the other blades in the enclosure or data center.

The DIMMs 160 are driven by the memory controllers 120. The memory controllers 120 manage the memory, including reading, writing, and refreshing DIMMs using advance error correction schemes such as double chip spare.

In addition to standard online operations, the memory controllers 120 and DIMMs 160 could be put into a lower power sleep state to minimize power consumption when activity is low. Also, the base blade can incorporate either battery or ultra-capacitor power storage to allow the blade 100 to maintain volatile contents when the blade enclosure power is not present. In addition, the base blade could include a small form factor disk drive allowing portable, non-volatile movement of the memory image. Finally, the DIMMs 160 themselves may be housed on sub-modules that are in themselves hot pluggable, allowing for RAID memory solutions.

Figure 2:
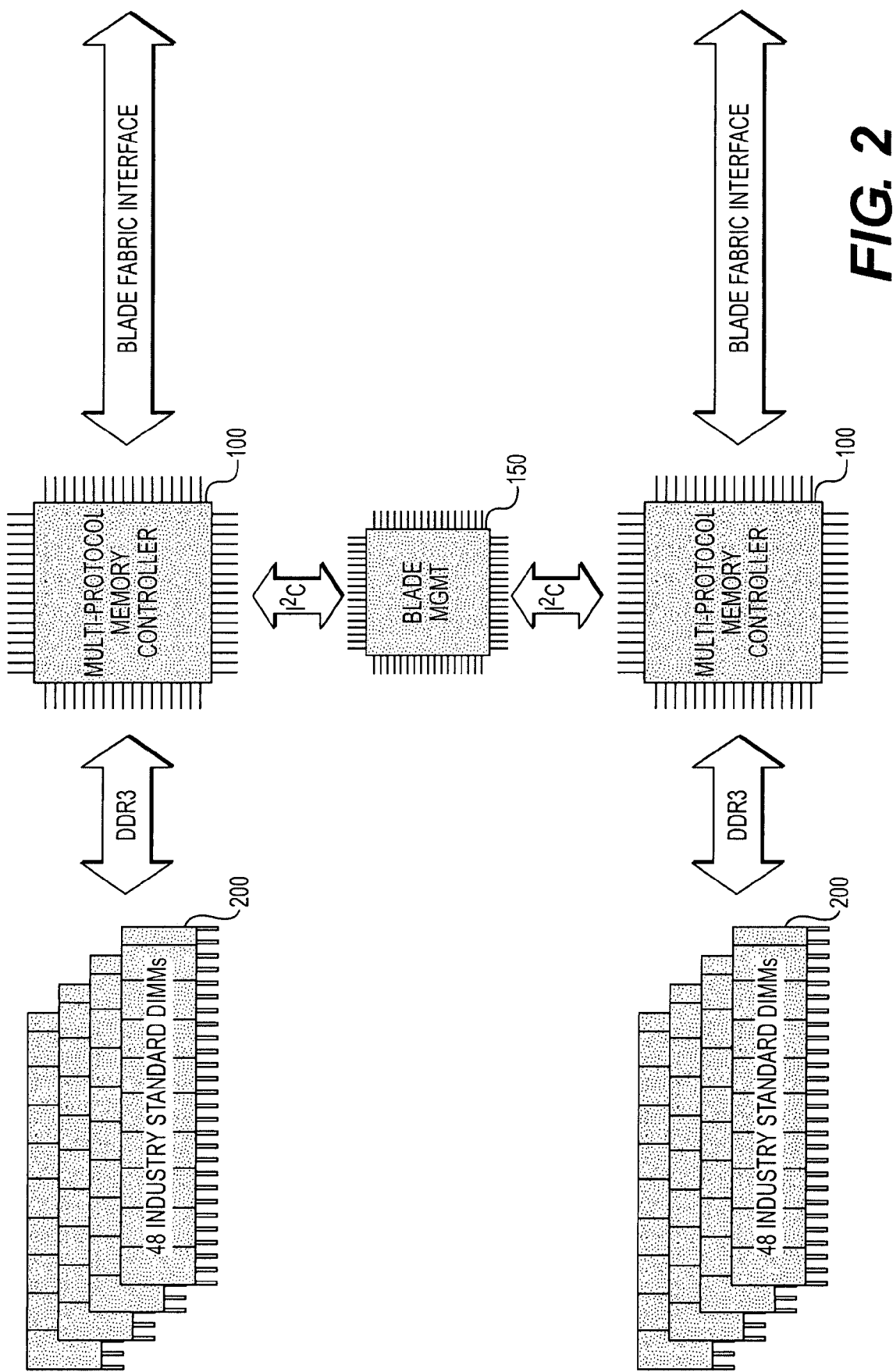
FIG. 2 is a block diagram of an embodiment of a memory expansion blade.

FIG. 2 is a block diagram of an exemplary memory expansion blade. The memory expansion blade connects DDR3 DIMMs 200 to a host system (not shown) using a generic blade fabric. examples of such fabrics include Backplane Ethernet, Fiber Channel, InfiniBand, and PCI Express. The DIMMs 200 are controlled by multi-protocol memory controllers 100, which in turn receive signaling from blade management module 150.

What is claimed is:

1. A memory expansion blade for a multi-protocol architecture, comprising:
a blade fabric connection to connect said memory expansion blade to a plurality of server blades;
a plurality of dual inline memory modules (DIMMs) that are industry standard DIMMs;
a multi-protocol memory controller coupled to the DIMMs and operable to control operations of the DIMMs and configured to provide said plurality of server blades with expansion memory, the controller, comprising:
two or more memory channel controllers, each of the memory channel controllers coupled to a single channel of DIMM, wherein the DIMM in each single channel operate according to a specific protocol, and wherein each of the memory channel controllers performs address decoding, read/write operations, memory refreshing, and error correction,
a protocol engine coupled to the memory channel controllers, wherein the protocol engine is configurable to accommodate one or more of the specific protocols, wherein the specific protocol is selected from a list consisting of fully buffered DIMM protocol, Infiniband, PCI-E protocol, Ethernet with iWARP/RDMA protocol, cHT protocol, and CSI cache coherency protocol, and
a system interface coupled to the protocol engine and configurable to provide electrical power and common low voltage differential signaling appropriate for the one or more of the specific protocols; and
a disk drive capable of receiving at least a portion of memory resident on the memory expansion blade.

2. The memory expansion blade of claim 1, further comprising an interface to provide signaling and power to the memory expansion blade from one or more devices external to the memory expansion blade.

3. The memory expansion blade of claim 1, wherein the channels comprise one or more first memory channels having memory devices operable according to a first protocol and one or more second memory channels operable according to a second protocol.

4. The memory expansion blade of claim 1, wherein the DIMMs are DDR DIMM.

5. The memory expansion blade of claim 1, wherein the protocol engine is configured with a protocol based on a user selection.

6. The memory expansion blade of claim 1, wherein the protocol engine is configured with a protocol from an automatic selection based on other blades installed with the memory expansion blade.

7. The memory expansion blade of claim 1, further comprising:
a low power sleep mode useable to minimize power consumption; and
a power storage device to allow the memory expansion blade to maintain volatile content upon loss of normal power to the memory expansion blade.

8. The memory expansion blade of claim 7, wherein the power storage device comprises a ultra-high capacitor.

9. A memory expansion blade for multiple architectures, comprising:
a blade fabric connection to connect said memory expansion blade to a plurality of server blades;
a plurality of inline memory modules (DIMMs), which are industry standard DIMMs, wherein the plurality of DIMMs comprises two or more channels of DIMMs, wherein the DIMMs in each single channel operate according to a same protocol; and means for controlling operation of the DIMMs, including a disk drive capable of receiving at least a portion of memory resident on the memory expansion blade and for providing said plurality of server blades with expansion memory, comprising:

a memory channel controller for each of the two or more channels of DIMMs, wherein each of the memory channel controllers performs address decoding, read/write operations, memory refreshing, and error correction, a protocol engine coupled to the one or more memory channel controllers, wherein the protocol engine is configurable to accommodate one or more specific protocols, wherein the specific protocol is selected from a list consisting of fully buffered DIMM protocol, Infiniband, PCI-E protocol, Ethernet with iWARP/RDMA protocol, cHT protocol, and CSI cache coherency protocol, and a system interface coupled to the protocol engine and configurable to provide electrical power and common low voltage differential signaling appropriate for the specific protocols.

10. The memory expansion blade of claim 9, further comprising means for providing electrical power and signaling to the memory expansion blade from one or more devices external to the memory expansion blade.

11. The memory expansion blade of claim 9, further comprising means for configuring the protocol engine.

12. The memory expansion blade of claim 9, further comprising means for configuring the system interface.

13. A memory expansion blade for multiple architectures, comprising:

a blade fabric connection to connect said memory expansion blade to a plurality of server blades;

two or more channels of memory devices, all the memory devices in a specific channel operating according to a same protocol, wherein the memory devices are industry standard memory devices; and a memory controller configured to provide said plurality of server blades with expansion memory comprising:

a memory channel controller for each of the two or more channels of memory devices, wherein each of the memory channel controllers performs address decoding, read/write operations, memory refreshing, and error correction, a protocol engine configurable to operate a plurality of protocols, wherein the protocol engine is configured with a protocol from an automatic selection based on other blades installed with the memory expansion blade, wherein the protocol is selected from a list consisting of fully buffered DIMM protocol, Infiniband, PCI-E protocol, Ethernet with iWARP/RDMA protocol, cHT protocol, and CSI cache coherency protocol, means for selecting one or more of the plurality of protocols depending on types of the memory devices in the one or more channels, and a system interface coupled to the protocol engine and configurable to provide electrical power and common law voltage differential signaling appropriate for one or more of the plurality of protocols.

14. The memory expansion blade of claim 13, wherein the channels of memory comprise two or more first memory channels having memory devices operable according to a first protocol and one or more second memory channels operable according to a second protocol.

15. The memory expansion blade of claim 13, further comprising:

a low power sleep mode useable to minimize power consumption;

a power storage device to allow the memory expansion blade to maintain volatile content upon loss of normal power to the memory expansion blade; and a disk drive capable of receiving at least a portion of memory resident on the memory expansion blade.

* * * * *

UNITED STATES PATENT AND TRADEMARK OFFICE
CERTIFICATE OF CORRECTION

PATENT NO. : 8,230,145 B2
APPLICATION NO. : 11/882265
DATED : July 24, 2012
INVENTOR(S) : Kirk M. Bresniker Page 1 of 1

It is certified that error appears in the above-identified patent and that said Letters Patent is hereby corrected as shown below:

In the Claims

In column 6, line 44, in Claim 4, delete "DDR" and insert -- DDR3 --, therefor.

Signed and Sealed this
Twenty-eighth Day of May, 2013

Teresa Stanek Rea
*Acting Director of the United States Patent and Trademark Office*